United States Patent
Smegal et al.

(10) Patent No.: US 7,737,074 B2
(45) Date of Patent: Jun. 15, 2010

(54) SULFUR TOLERANT NOBLE METAL CONTAINING AROMATICS HYDROGENATION CATALYST AND A METHOD OF MAKING AND USING SUCH CATALYST

(75) Inventors: John Anthony Smegal, Houston, TX (US); Johannes Anthonius Robert Van Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 266 days.

(21) Appl. No.: 11/764,474

(22) Filed: Jun. 18, 2007

(65) Prior Publication Data

US 2008/0027253 A1    Jan. 31, 2008

Related U.S. Application Data

(60) Provisional application No. 60/805,272, filed on Jun. 20, 2006.

(51) Int. Cl.
  *B01J 21/04*  (2006.01)
  *B01J 21/06*  (2006.01)
  *B01J 23/40*  (2006.01)
(52) U.S. Cl. .................. 502/240; 502/242; 502/349
(58) Field of Classification Search ............... 502/240, 502/242, 349
See application file for complete search history.

(56) References Cited

U.S. PATENT DOCUMENTS

| | | | | |
|---|---|---|---|---|
| 3,783,123 | A * | 1/1974 | Young | 208/111.15 |
| 3,869,522 | A | 3/1975 | Van der Eijk | 260/667 |
| 3,943,053 | A | 3/1976 | Kovach et al. | 208/143 |
| 4,849,093 | A | 7/1989 | Vauk et al. | 208/143 |
| 5,217,938 | A * | 6/1993 | Reinalda et al. | 502/325 |
| 5,271,828 | A | 12/1993 | Clark et al. | 208/143 |
| 5,308,814 | A | 5/1994 | Kukes et al. | 502/66 |
| 5,902,767 | A * | 5/1999 | Kresge et al. | 502/308 |
| 6,679,986 | B1 | 1/2004 | Da Silva et al. | 208/213 |
| 2005/0130837 | A1 * | 6/2005 | Hoek et al. | 502/325 |
| 2005/0197249 | A1 * | 9/2005 | Creyghton et al. | 502/439 |

FOREIGN PATENT DOCUMENTS

| | | |
|---|---|---|
| EP | 0428223 | 5/1991 |
| EP | 1614739 | 1/2006 |
| FR | 2783252 | 3/2000 |
| JP | 10180097 | 12/1996 |

* cited by examiner

*Primary Examiner*—Elizabeth D Wood
(74) *Attorney, Agent, or Firm*—Charles W. Stewart

(57) ABSTRACT

An aromatics hydrogenation catalyst composition which comprises a noble metal component and a support comprising zirconia, silica, and, optionally, alumina. The catalyst composition is manufactured by co-mulling silica, a zirconium compound, and, optionally, alumina to form a mixture that is formed into a shape, such as by extrusion to form an extrudate, with the shape being calcined and noble metal being incorporated into the shape. The catalyst composition may be used in the saturation of aromatic compounds.

25 Claims, No Drawings

SULFUR TOLERANT NOBLE METAL CONTAINING AROMATICS HYDROGENATION CATALYST AND A METHOD OF MAKING AND USING SUCH CATALYST

This application claims the benefit of U.S. Provisional Application No. 60/805,272 filed Jun. 20, 2006, the entire disclosure of which is hereby incorporated by reference.

The present invention relates to a sulfur tolerant noble metal aromatics hydrogenation catalyst, a method of making such catalyst, and a process for hydrogenating aromatics in a hydrocarbon feed stock having a sulfur concentration.

Many refinery middle distillate streams have concentrations of aromatics and sulfur compounds and often require further processing in order to provide a product having required or desired characteristics and properties. It is recognized that the removal of aromatics contained in diesel fuel can contribute to a desirable increase in its cetane number and that the removal of aromatics contained in jet fuel can contribute to an improvement in its smoke point. Also, for many refinery streams, the saturation of the aromatics contained therein can increase the volume of the yielded product.

Due to their higher hydrogenation activity as compared to the activity of non-noble metal (e.g. nickel, cobalt, molybdenum, and tungsten) sulfidic catalysts, noble metal catalysts have been used in the dearomatization of distillate feedstocks. The high hydrogenation activity of noble metal catalysts can provide for lower required reaction temperatures for dearomatization and, thus, a greater temperature operating range for dearomatization processing. One difficulty, however, with the use of noble metal catalysts for the dearomatization of distillate feedstocks is associated with their sulfur sensitivity and tendency of being poisoned by the presence of sulfur that is contained in the feedstock being processed. One problem with the processing of certain of the refinery middle distillate streams is that they often have a significant concentration of sulfur making the use of noble metal catalysts unsuitable for treating such refinery middle distillate streams without such streams first undergoing a desulfurization treatment to thereby reduce the sulfur content.

U.S. Pat. No. 3,943,053 discloses a selective aromatics hydrogenation catalyst. This patent asserts that its catalyst retains hydrogenation function over a significant period of time when used in the processing a sulfur-containing feedstock. The catalyst of the '053 patent includes platinum and palladium supported on an inert oxide catalyst support that is preferably a high surface area gamma alumina. Alumina is indicated as being preferred over silica-alumina. A necessary and critical part of the catalyst preparation is the simultaneous impregnation of its carrier with both the platinum and the palladium salts in the same aqueous solution. Also indicated is that for the taught catalyst there is an optimum weight ratio of platinum-to-palladium when it is used in dearomatization. The '053 patent does not teach the use of zirconia as a catalyst support material or the co-mulling of a zirconium compound with an inorganic oxide material in the preparation of its support.

Numerous other patents teach various types of support materials for use in noble metal dearomatization catalyst compositions. For example, U.S. Pat. No. 5,308,814 discloses the use of zeolite Y as a support material for supporting platinum and palladium. The support component of the catalyst of the '814 patent comprises zeolite Y and a refractory inorganic oxide such as silica, alumina, or silica-alumina. The zeolite Y is present in the support in an amount ranging from 10 wt. % to 90 wt. %. This patent does specifically disclose the use of zirconium or zirconia as a component of its catalyst support.

Another example of a support material used in noble metal dearomatization catalyst compositions is that taught by U.S. Pat. No. 5,271,828. This patent discloses a dearomatizaation catalyst including platinum and palladium on a support comprising borosilicate. The borosilicate of the support may be mixed with a porous oxide matrix material such as alumina, silica, silica-alumina, zirconia, and titania. It is suggested that the porous oxide matrix material does not contribute to the hydrogenation function of the catalyst, but, rather, it facilitates shaping or forming. The borosilicate is generally present in the support in an amount in the range of from 20 wt % to 70 wt %, but, more preferably, from 35 wt. % to 45 wt. %.

U.S. Pat. No. 4,849,093 discloses a two-step aromatic saturation process that employs hydroprocessing catalysts comprising a hydrogenation metal on a support. The more preferred aromatic saturation catalyst contains Group VIII and/or Group VIB metal components on a support material typically containing a porous refractory oxide. Possible porous refractory oxides include silica, magnesia, silica-magnesia, zirconia, silica-zirconia, titania, silica-titania, alumina, silica-alumina, and the like. The preferred refractory oxide material is alumina. This patent does not teach the preparation of a support by co-mulling a zirconium compound with an inorganic oxide material. The '093 patent indicates that its aromatics saturation catalyst may include a non-noble metal Group VIII metal or a Group VIB metal, or both, as components. There is no indication in the '093 patent that a zirconia supported noble metal catalyst is particularly useful for aromatics hydrogenation or that it can have a sulfur tolerance.

U.S. Pat. No. 3,869,522 discloses an aromatics hydrogenation process that uses a catalyst containing a Group VIII noble metal supported on a carrier comprising 30-90 wt. % silica, 10-70 wt. % zirconia, and 0-25 wt. % alumina. The process of the '522 patent is directed to the hydrogenation of low-sulfur aromatic-containing hydrocarbon oil fractions. Feedstocks with excessive sulfur content can be catalytically desulfurized before applying the process of the '522 patent. The silica-zirconia and silica-zirconia-alumina carriers are preferably prepared by precipitating the zirconia or zirconia and alumina onto a silica hydrogel and subsequently drying and calcining the material. The preferred noble metal is platinum, and other noble metals may be used either alone or in combination with the platinum. The '522 patent suggests that its noble metal hydrogenation catalysts are sensitive to sulfur exposure, and there is no recognition that a calcined co-mulled mixture of a zirconium compound and an inorganic oxide provides a particularly useful support for platinum and palladium metals to give a sulfur tolerant dearomatization catalyst.

It is desirable to have a noble metal aromatics hydrogenation catalyst composition that is tolerant to sulfur exposure when it is used in the dearomatization of a hydrocarbon feedstock.

It is also desirable to have an economical method for manufacturing a noble metal aromatics hydrogenation catalyst that has both a high aromatics hydrogenation activity and is tolerant to sulfur poisons.

It is further desirable to have a process for the hydrogenation of aromatics that are contained in a hydrocarbon feedstock that also has a concentration of sulfur.

Accordingly, provided is a sulfur tolerant aromatics hydrogenation catalyst, comprising: from 1 to 30 wt % zirconia, from 0.01 to 5 wt % of a noble metal selected from the group consisting of platinum, palladium and a combination thereof, and from 60 to 99% inorganic oxide selected from the group consisting of silica, alumina and silica-alumina. Another embodiment of the aromatics hydrogenation catalyst comprises a noble metal selected from the group consisting of platinum, palladium and a combination thereof and a calcined mixture wherein said mixture of said calcined mixture, before calcination, comprises a zirconium compound and an inorganic oxide selected from the group consisting of silica, alumina and silica-alumina.

Further provided is a method of making a composition, wherein said method comprises:

co-mulling a zirconium compound and an inorganic oxide selected from the group consisting of silica, alumina and silica-alumina to form a mixture; forming an agglomerate particle comprising said mixture; and calcining said agglomerate particle to thereby provide a calcined particle suitable for use as a catalyst support.

Also provided is a process for hydrogenating aromatics of a hydrocarbon feedstock containing a concentration of sulfur and a concentration of aromatics, wherein said process comprises: contacting said hydrocarbon feedstock, under suitable aromatics hydrogenation conditions, with a catalyst composition, comprising: from 1 to 30 wt % zirconia, from 0.01 to 5 wt % for each of the noble metals selected from the group consisting of platinum, palladium and a combination thereof, and from 60 to 99% inorganic oxide selected from the group consisting of silica, alumina and silica-alumina; and yielding a product having a reduced aromatics concentration.

The invention relates to a novel aromatics hydrogenation catalyst that has improved sulfur tolerance over comparative prior art aromatics hydrogenation catalysts and to a process for the dearomatization of a hydrocarbon feedstock that has a sulfur concentration. The invention also relates to a novel support composition and method of making such support composition that may suitably be used as a support or carrier for at least one noble metal that is incorporated therein so as to provide a final catalyst composition of the invention.

The sulfur tolerant aromatics hydrogenation catalyst of the invention comprises at least one noble metal component incorporated onto a catalyst support, which catalyst support comprises zirconia and another inorganic oxide component. It is generally expected by those skilled in the art that noble metal catalysts tend to be sensitive to sulfur poisoning and, therefore, most of the prior art noble metal catalysts are not to be used in the processing of feedstocks having a significant sulfur content or that have not been hydrotreated prior to further treatment with the noble metal catalyst. The inventive aromatics hydrogenation catalyst, however, exhibits a tolerance to sulfur poisoning when used in the dearomatization of a hydrocarbon feedstock containing a concentration of sulfur as well as a concentration of aromatics thereby allowing for the processing of a hydrocarbon feedstock having a relatively high sulfur concentration, or a hydrocarbon feedstock that has not previously, or only mildly, been hydrotreated.

While the reason is not known with certainty, it is believed that the catalyst support used in the preparation of the sulfur tolerant aromatics hydrogenation catalyst contributes in some way toward the sulfur tolerance properties of the inventive aromatics hydrogenation catalyst. The catalyst support component of the sulfur tolerant aromatics hydrogenation catalyst is a mixture of a zirconium compound and an inorganic oxide component, wherein the mixture has been calcined. This catalyst support is combined with at least one noble metal component to provide the sulfur tolerant aromatics hydrogenation catalyst of the invention that comprises at least one noble metal component and a calcined mixture of a zirconium compound and an inorganic oxide component. A more specific embodiment of the sulfur tolerant aromatics hydrogenation catalyst comprises zirconia in an amount in the range of from 1 to 30 weight percent, at least one noble metal component in an amount in the range of from 0.01 to 5 weight percent, as the element, and another inorganic oxide component in an amount in the range of from 70 to 99 weight percent. These weight percent values are based on the total weight of the catalyst.

The catalyst support is prepared by co-mulling a zirconium compound and an inorganic oxide material to thereby form a mixture, which comprises the zirconium compound and inorganic oxide material. The mixture is used in forming an agglomerate particle that comprises the mixture. The agglomerate particle is then dried and calcined to provide a calcined particle that is suitable for use as the catalyst support of the sulfur tolerant aromatics hydrogenation catalyst of the invention.

The term "co-mulling" is used broadly in this specification to mean that at least the recited starting materials are mixed together to form a mixture of the individual components of the mixture that is preferably a substantially uniform or homogeneous mixture of the individual components of such mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

The zirconium compound used in the preparation of the catalyst support may be provided from any suitable source of zirconium that is convertible to zirconia ($ZrO_2$) upon the calcination of the mixture or agglomerate particle in air or an oxygen-containing atmosphere. The zirconium compound, thus, may be selected from the group consisting of oxides, nitrates, silicates, carbonates, acetates, chlorides, hydroxides, and hydrates of zirconium. Specific examples of possible suitable zirconium compounds to be co-mulled with the inorganic oxide include zirconyl chloride ($ZrOCl_2 \cdot 8H_2O$); zirconyl hydroxide ($ZrO(OH)_2$); zirconyl sulfate ($ZrO(SO_4)$); sodium zirconyl sulfate ($ZrO(SO_4) \cdot Na_2SO_4$); zirconyl carbonate ($ZrO(CO_3)$) ; ammonium zirconyl carbonate (($NH_4)_2ZrO(CO_3)_2$); zirconyl nitrate ($ZrO(NO_3)_2$) ; zirconyl acetate ($ZrO(C_2H_3O_2)_2$) ammonium zirconyl acetate (($NH_4)_2ZrO(C_2H_3O_2)_3$); zirconyl phosphate ($ZrO(HPO_4)_2$); zirconium tetrachloride ($ZrCl_4$); zirconium silicate ($ZrSiO_4$); and zirconium oxide ($ZrO_2$). The preferred zirconium compounds include ammonium zirconyl carbonate and zirconyl acetate.

The inorganic oxide material used in the preparation of the catalyst support may be selected from the group of inorganic oxides consisting of silica, alumina, silica-alumina and any combination of two or more thereof. The preferred inorganic material to be combined with the zirconium compound to form the mixture that is to be agglomerated and calcined to provide the catalyst support is selected from either silica or alumina, or a combination of both.

A significant feature of the invention is that the zirconium compound and the inorganic oxide material are to be co-mulled to form the mixture of the two components as opposed to using a precipitation method to form a mixture of zirconia and another inorganic oxide. The use of co-mulling instead of co-precipitation can be a more economical approach to preparing the catalyst support. Moreover, while not wanting to be bound to any particular theory, it is believed that the co-mulling of the starting components used in making the catalyst support, in combination with the other steps of preparing the catalyst support, contributes to the special properties of the sulfur tolerant aromatics hydrogenation catalyst of the invention.

In the co-mulling of the starting materials of the mixture, it is preferred to add the zirconium compound by way of an aqueous solution and for the inorganic oxide material to be in the form of a powder or fine particles that may be contained within an aqueous slurry. While the specific concentration of the zirconium compound in the solution is not a critical aspect of the invention, the solution and the inorganic oxide material should be combined together in a manner so as to provide a mixture having the properties required for forming the particular desired type of agglomerate particle and having such amounts of zirconium compound and inorganic oxide material that the calcined agglomerate particle has the final desired zirconium content and inorganic oxide content. It is preferred for the co-mulled mixture to have properties of a paste that is suitable for extrusion to form extrudate particles capable of being dried and calcined to yield a calcined particle (i.e., catalyst support).

The co-mulled mixture is to contain an amount of zirconium compound such that the calcined agglomerate particle has a zirconium content in the range of from 1 to 30 weight percent (wt. %), with the weight percent being based on the total weight of the calcined particle and calculated assuming the zirconium is metal. The co-mulled mixture is to contain an amount of inorganic oxide material such that the calcined agglomerate particle has an inorganic oxide content in the range of from 70 to 99 wt. %, with the weight percent being based on the total weight of the calcined particle.

The type of inorganic oxide material used in the preparation of the catalyst support can impact the performance properties of the final catalyst composition of the invention, and it can impact the zirconium content required for the catalyst support of the invention.

When the catalyst support contains both silica and alumina in relative amounts such that the molar ratio of silica-to-alumina is in the range of from 1:10 to 10:1, the catalyst support is to contain a zirconium content, as the element, in the amount in the range of from 0.5 to 20 wt. %, preferably, from 1 to 15 wt. %, and, most preferably, from 2 to 10 wt. % with the weight percent being based on the total weight of the catalyst support and calculated assuming the zirconium is metal.

When the support has a silica-to-alumina molar ratio of greater than 10:1, including when the support has a substantial absence of alumina or only silica in combination with zirconia, the catalyst support is to have a zirconium content, as the element, in the amount in the range of from 3 to 30 wt. %, preferably, from 5 to 25 wt. %, and, most preferably, from 7 to 20 wt. % with the weight percent being based on the total weight of the catalyst support and calculated assuming the zirconium is metal.

As earlier mentioned, the co-mulled mixture is formed into an agglomerate particle, such as, for example, a spheroid, a pill, a tablet, a pellet, or an extrudate. It is preferred for the agglomerate particle to be a shaped particle that is formed by using known extrusion means for extruding the co-mulled mixture to thereby form an extrudate particle comprising the co-mulled mixture. A drying step may advantageously be used for removing certain quantities of water or volatiles that are included within the agglomerate particle. The drying of the agglomerate particle may be conducted at any suitable temperature for removing excess water or volatiles, but, preferably, the drying temperature will be in the range of from about 75° C. to 250° C. The time period for drying the agglomerate particle is any suitable time period necessary to provide for the desired amount of reduction in the volatile content of the agglomerate particles prior to the calcination step.

The dried or undried agglomerate particle is calcined in the presence of an oxygen-containing fluid, such as air, at a temperature and for a time period that is suitable for achieving the desired degree of calcination to provide a calcined particle that is suitable for use as the catalyst support of the sulfur tolerant aromatics hydrogenation catalyst. Generally, the calcination temperature is in the range of from 450° C. (842° F.) to 850° C. (1562° F.). The preferred calcination temperature is in the range of from 550° C. (1022° F.) to 750° C. (1382° F.).

To prepare an intermediate catalyst composition that is to be subsequently dried or calcined, or both, to provide the final catalyst composition of the invention, at least one noble metal component is incorporated into the calcined particle (catalyst support). The noble metal of the noble metal component may be selected from the group of noble metals consisting of platinum and palladium. The at least one noble metal component can be deposited or incorporated upon the catalyst support by using any of the suitable means or methods known to those skilled in the art for incorporating a noble metal into a catalyst support. It is preferred to use an impregnation method to incorporate the noble metal component into the catalyst support, and, among these methods, it is preferred to incorporate the noble metal component into the catalyst support using the well known incipient wetness method.

The impregnation solution of the noble metal solution comprises a heat-decomposable salt of platinum or of palladium, or of both platinum and palladium, dissolved in water. Examples of possible platinum salts that may be used include the platinum compounds of: chloroplatinic acid; ammonium chloroplatinate; bromoplatinic acid; platinum trichloride; platinum tetrachloride hydrate; platinum dichlorocarbonyl dichloride; dinitrodiaminoplatinum; sodium tetranitroplatinate and tetraammine platinum(II) nitrate. Examples of possible palladium salts that may be used include the palladium compounds of: chloropalladic acid; palladium chloride; palladium nitrate; palladium sulfate; diamine palladium hydroxide; tetraammine palladium chloride and tetraammine palladium(II) nitrate. The preferred platinum compound and palladium compound for use in the impregnation solution are, respectively, tetraammine platinum(II) nitrate and tetraammine palladium(II) nitrate.

The amount of noble metal incorporated into the catalyst support should be such as to provide the final catalyst composition of the invention having a noble metal content that is in the range of from 0.01 wt. % to 5 wt. % for each of the noble metals with the weight percent being based on the total weight of the final catalyst composition and calculated as elemental metal. The preferred noble metal content for each noble metal component is in the range of from 0.1 wt. % to 4 wt. %, and, most preferred, from 0.2 to 3 wt. %.

While the final catalyst composition may include either a platinum noble metal component or a palladium metal component or both a platinum and a palladium noble metal component, it should be recognized that the use of a combination of the two noble metals contained in the sulfur tolerant aromatics hydrogenation catalyst can provide enhanced aromatics hydrogenation activity, especially when the catalyst is used in processing of hydrocarbon feedstocks having significant sulfur concentrations, as compared to catalyst compositions containing only one or the other noble metal. Thus, it is preferred for the final catalyst composition of the invention to comprise both a platinum component and a palladium component. In the preferred final catalyst composition, the weight ratio of elemental palladium-to-platinum is in the range of from 1:10 to 10:1, preferably, from 1:2 to 5:1, and, most preferably, from 1:1 to 3:1.

The intermediate catalyst composition is dried at any suitable temperature for removing excess water or volatiles therefrom. Generally, the drying temperature will be in the range of from about 75° C. to 250° C. The time period for drying the intermediate catalyst composition is any suitable time period necessary to provide for the desired amount of reduction in the volatile content and to provide a dried intermediate catalyst composition prior to its calcination.

The dried intermediate catalyst composition is calcined in the presence of an oxygen-containing fluid, such as air, at a temperature and for a time period that is suitable for achieving the desired degree of calcination to provide the final catalyst composition (sulfur tolerant aromatics hydrogenation catalyst). Generally, the calcination temperature is in the range of from 250° C. (482° F.) to 550° C. (1022° F.). The preferred calcination temperature is in the range of from 280° C. (536° F.) to 520° C. (968° F.).

The final catalyst composition of the invention generally has a surface area in the range of from 200 $m^2$/gm to 600 $m^2$/gm, as determined by the BET method employing $N_2$. The aforementioned recited range for the surface area is applicable to the final catalyst composition that contains either silica in combination with the zirconia or silica and alumina in combination with the zirconia.

For a final catalyst composition that was prepared using a catalyst support containing both silica and alumina in the relative amounts such that the molar ratio of silica-to-alumina is in the range of from 1:10 to 10:1, the surface area of the final catalyst composition is, in general, in the range of from 300 $m^2$/gm to 600 $m^2$/gm, preferably, from 350 $m^2$/gm to 550 $m^2$/gm, and, most preferably, from 400 $m^2$/gm to 500 $m^2$/gm.

For a final catalyst composition that was prepared using a catalyst support having a silica-to-alumina molar ratio exceeding 10:1, including when the support has a substantial absence of alumina or substantially only silica in combination with zirconia, the surface area of the final catalyst composition is, in general, in the range of from 200 $m^2$/gm to 500 $m^2$/gm, preferably, from 250 $m^2$/gm to 450 $m^2$/gm, and, more preferably, from 300 $m^2$/gm to 400 $m^2$/gm.

The pore volume of the final catalyst composition as determined by using standard mercury porosimety methodology is generally in the range of from 0.7 ml/gm to 1.3 ml/gm, and the median pore diameter of the final catalyst composition is in the range of from 50 angstroms (Å) to 250 angstroms.

The final catalyst composition of the invention is particularly useful in processes for the hydrogenation of aromatic hydrocarbons, and, especially, it is useful for the dearomatization of aromatics-containing hydrocarbon feedstocks that also contain significant concentrations of sulfur. Indeed, one of the special features of the invention is that the final catalyst composition is less sensitive to sulfur poisoning than other noble metal catalysts. This sulfur tolerance permits the processing of aromatics-containing hydrocarbon feedstocks that have not been hydrotreated or that have been minimally hydrotreated to reduce their sulfur content.

Thus, while the final catalyst composition may be employed in the hydrogenation of a wide variety of feedstocks and in a wide variety of applications, one particularly desirable application is in the processing of a hydrocarbon feedstock that contains both a concentration of aromatics and a concentration of sulfur.

One contemplated hydrocarbon feedstock of the invention includes a refinery distillate stream comprising hydrocarbons having boiling temperatures at atmospheric pressure in the range of from about 140° C. (284° F.) to about 410° C. (770° F.) These temperatures are approximate initial and final boiling temperatures of the distillate feedstock. Examples of the refinery streams intended to be included within the meaning of the term refinery distillate stream or distillate feedstock include straight run distillate fuels boiling in the referenced boiling range, such as kerosene, jet fuel, light diesel oil, heating oil, and heavy diesel oil, and the cracked distillates, such as FCC cycle oil, coker gas oil, and hydrocracker distillates.

Another contemplated hydrocarbon feedstock of the invention includes a refinery heavy oil fraction having a boiling range that at least in part overlaps the lubricating base oil boiling range. The source of the refinery heavy oil fraction may be a light or heavy vacuum gas oil derived from the vacuum distillation of an atmospheric residue fraction obtained by the atmospheric distillation of a crude oil. The boiling range of such vacuum gas oil is generally from 300° C. (572° F.) to 620° C. (1148° F.). Prior to its used in the inventive process, the refinery heavy oil fraction may be processed by known hydrocracking and dewaxing, e.g. solvent dewaxing and catalytic dewaxing, process steps so as to provide a product having various of the desired properties for a lubricating base oil. The inventive process may include the processing of the refinery heavy oil fraction that has already been treated by process steps such as hydrocracking and dewaxing or the processing of the refinery heavy oil that has not undergone prior treatment. In the treating of the refinery heavy oil fraction, it is preferred to use the final catalyst composition of the invention as a catalyst for hydrofinishing a lubricating base oil feedstock having a boiling range of from 350° C. (662° F.) to 580° C. (1076° F.) and which is a refinery heavy oil fraction having been hydrotreated and dewaxed.

The sulfur concentration of the hydrocarbon feedstock can be a high concentration, for instance, being in the range upwardly to about 0.5 weight percent of the hydrocarbon feedstock based on the weight of elemental sulfur and the total weight of the hydrocarbon feedstock inclusive of the sulfur compounds. Typically, however, the hydrocarbon feedstock of the inventive process has a sulfur concentration in the range of from 10 ppmw to 1000 ppmw. But, more typically, the sulfur concentration is in the range of from 15 ppmw to 500 ppmw, and, most typically, from 20 ppmw to 100 ppmw. It is understood that the references herein to the sulfur content of the hydrocarbon feedstock are to those compounds that are normally found in refinery distillate streams or in hydrodesulfurized distillate products and are chemical compounds that contain a sulfur atom and which generally include organosulfur compounds.

One embodiment of the inventive process involves the hydrogenation removal of aromatics compounds that are in the hydrocarbon feedstock in order to provide or yield a product having a reduced concentration of aromatics as compared to the concentration of aromatics in the hydrocarbon feedstock. In such a dearomatization process, the hydrocarbon feedstock may include an aromatics concentration in the range of from 1 wt. % to 80 wt. %, with the weight percent being based on the total weight of the hydrocarbon feedstock, including the aromatics and sulfur components thereof. The more applicable hydrocarbon feedstock aromatics concentration is in the range of from 2 wt. % to 30 wt. %, and, most applicable, the hydrocarbon feedstock aromatics concentration is from 3 wt. % to 20 wt. %.

The final catalyst composition of the invention may be employed as a part of any suitable reactor system that provides contacting the catalyst thereof with the hydrocarbon feedstock under suitable dearomatization or aromatics hydrogenation conditions that may include the presence of hydrogen and an elevated pressure and temperature. One preferred reactor system is that which includes a bed of the final catalyst composition contained within a reactor vessel equipped with a reactor feed inlet means, such as a feed nozzle, for introducing the hydrocarbon feedstock into the reactor vessel, and a reactor effluent outlet means, such as an effluent outlet nozzle, for withdrawing the reactor effluent or the product having a reduced aromatics concentration from the reactor vessel.

It is a significant aspect of the inventive process that it provides for the dearomatization of an aromatics-containing hydrocarbon feedstock that comprises a concentration of sulfur by contacting the hydrocarbon feedstock under suitable aromatics hydrogenation conditions with the sulfur tolerant aromatics hydrogenation catalyst of the invention and yielding a product that has a reduced aromatics concentration as compared with the aromatics concentration of the hydrocarbon feedstock. The sulfur tolerant aromatics hydrogenation catalyst provides the advantage of having a tolerance to sulfur poisoning as compared to many of the prior art catalysts, thus, allowing for the processing of feedstocks having higher than normal sulfur concentrations or allowing for less severe hydrotreating of the feedstocks prior to dearomatization thereof.

The amount of dearomatization provided by the inventive process generally exceeds 20 molar percent of the aromatics contained in the hydrocarbon feedstock. But, it is desirable for the inventive process to provide a molar percent dearomatization of the hydrocarbon feedstock that exceeds 40 molar percent. It is preferred for the inventive process to provide for a dearomatization of more than 50 molar percent, and, most preferred, more than 80 molar percent. The term molar percent dearomatization is used herein to mean the fraction of the moles of aromatics contained in the hydrocarbon feedstock that are saturated by the inventive process divided by the total moles of aromatics contained in the hydrocarbon feedstock. The molar percent dearomatization may be calculated by dividing the difference in the total moles of aromatics in the hydrocarbon feedstock and in the product by the total moles of aromatics in the hydrocarbon feedstock. Thus, the product of the inventive process will have a reduced aromatics concentration such that it contains an amount of aromatics that is not more than 80 molar percent of the aromatics contained in the hydrocarbon feedstock, but desirably, not more than 60 molar percent. It is preferred for the product to contain an amount of aromatics that is not more than 50 molar percent of the aromatics contained in the hydrocarbon feedstock, and, most preferred, not more than 20 molar percent.

When the inventive process is dearomatizing a refinery distillate stream as its hydrocarbon feedstock, the reaction pressure is generally in the range of from 10 bar (145 psi) to 100 bar (1470 psi), preferably from 20 bar (290 psi) to 70 bar (1028 psi), and, more preferably, from 30 bar (435 psi) to 60 bar (870 psi).

For the dearomatization of a hydrocarbon feedstock, the reaction temperature at which the hydrocarbon feedstock is contacted with the final catalyst composition is in the range of from 125° C. (247° F.) to 350° C. (662° F.), preferably, from 150° C. (302° F.) to 325° C. (617° F.), and, most preferably, from 175° C. (347° F.) to 300° C. (572° F.).

The flow rate at which the hydrocarbon feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the hydrocarbon feedstock is charged to the reaction zone of the inventive process in volume per hour divided by the volume of catalyst contained in the reaction zone to which the hydrocarbon feedstock is charged. The preferred LHSV is in the range of from 0.05 $hr^{-1}$ to 6 $hr^{-1}$, more preferably, from 0.1 $hr^{-1}$ to 4 $hr^{-1}$, and, most preferably, from 0.2 $hr^{-1}$ to 3 $hr^{-1}$.

The amount of hydrogen charged to the reaction zone of the inventive process can be greatly dependent upon the amount of aromatics contained in the hydrocarbon feedstock that is to be dearomatized. Generally, the amount of hydrogen relative to the amount of hydrocarbon feedstock charged to the reaction zone is in the range upwardly to 1781 $m^3/m^3$ (10,000 SCF/bbl). It is preferred for the hydrogen gas charge rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The following examples are presented to further illustrate certain aspects of the invention, but they are not to be construed as unduly limiting the scope of the invention.

EXAMPLE I

The descriptions in this Example I illustrate the preparation of the inventive catalyst and comparison catalysts.

1. Preparation of Zirconia-Silica Support

A zirconia-silica support consisting of 14% zirconia and 86% silica was prepared as follows. A precipitated silica such as Sipernat 50, 5.07 kg (LOI=10.8%), is mixed with a zirconium source such as Bacote 20 (ammonium zirconium carbonate, 20% $ZrO_2$), 3.72 kg, and 9.8 kg of distilled water in a muller. To this is added acetic acid in an amount equal to 4 wt % of the dry basis mix. An extrusion aid such as Nalco 9779 may also be added at this time, also on a 4 wt % dry basis mix. The mixture is muiied for about 35 minutes and extruded through a die to give pellets of the desired shape and size. The extruded pellets are dried at 140 deg C. for 2 hours and then calcined at 740 deg C. for 2 hours. Surface area=371 $m^2/g$, Hg PV=0.98 cc/g, MPD(vol)=175 Angstroms 2. Preparation of Zirconia-Silica-Alumina Support A zirconia-silica-alumina support consisting of 7% zirconia, 40% silica and 53% alumina was prepared as follows. A silica-alumina powder (consisting of nominally 55% alumina and 45% silica), 3.08 kg (LOI=18.8%), is mixed with a zirconium source such as zirconium acetate solution, 1.07 kg, (12.55% Zr) and 3.0 kg of distilled water in a muller. The mixture is mulled for about 40 minutes and then extruded through a die to give pellets of the desired shape and size. The extruded pellets are dried at 140 deg C. for 2 hours and then calcined at 538 deg C. for 2 hours. Surface area=461 $m^2/g$, Hg PV=0.936 cc/g, MPD(vol)=76 Angstroms 3. Preparation of Boria-Silica-Alumina Support A boria-silica alumina support consisting of 1.6% boria, 44.3% silica and 54.1% alumina was prepared as follows. A silica-alumina powder (consisting of nominally 55% alumina and 45% silica), 3.0 kg (LOI=18.8%), is mixed with a boria source such as boric acid, 86.0 grams (17.49 boron) in a muller. A solution of nitric acid (1.25 wt % of the dry mix basis), 54 grams and 3.0 kg of distilled water is added. The mixture is mulled for about 120 minutes and then extruded through a die to give pellets of the desired shape and size. The extruded pellets are dried at 140 deg C for 2 hours and then calcined at 594 deg C. for 2 hours. Surface area=458 m²/g, Hg PV=0.763 cc/g, MPD(vol)=60 Angstroms 4. Preparation of Silica-Alumina Support A silica alumina support consisting of 43% silica and 57% alumina was prepared as follows. A silica-alumina powder (consisting of nominally 55% alumina and 45% silica), 3.0 kg (LOI=18.8%), is mixed in a muller and a solution of nitric acid (1.25 wt % of the dry mix basis), 54 grams and 3.3 kg of distilled water is added. The mixture is mulled for about 30 minutes and then extruded through a die to give pellets of the desired shape and size. The extruded pellets are dried at 140 deg C. for 2 hours and then calcined at 594 deg C. for 2 hours. Surface area=467 m²/g, Hg PV=0.992 cc/g, MPD(vol)=58 Angstroms 5. Preparation of Pt/Pd Catalysts A solution of $Pt(NH_3)_4(NO_3)_2$, 0.615 g, and $Pd(NH_3)_4(NO_3)_2$, 1.51 g, in DI water is adjusted to pH=9.5 with $NH_4OH$ and to a final volume equal to the total pore volume of 100 g of the support. This solution is impregnated onto the support and aged in a closed container for 2 hrs. The impregnated support is dried at 140 deg C. for 3 hrs and calcined at 285 C for 2 hrs to give the final catalyst.

TABLE 1

Catalyst Properties

| Catalyst | % Pt | % Pd | Catalyst Support | SA, m2/g | CBD, g/cc |
|---|---|---|---|---|---|
| A | 0.3 | 0.5 | $SiO_2$—$Al_2O_3$ | 420 | 0.470 |
| B | 0.3 | 0.5 | $B_2O_3$—$SiO_2$—$Al_2O_3$ | 410 | 0.458 |
| C | 0.3 | 0.5 | $ZrO_2$—$SiO_2$—$Al_2O_3$ | 434 | 0.434 |
| D | 0.3 | 0.5 | $ZrO_2$—$SiO_2$ | 360 | 0.399 |

Note:
CBD = compacted bulk density

EXAMPLE II

This Example II illustrates the use of the catalyst compositions described in Example I in the dearomatization of a hydrocarbon feedstock and presents performance data for the catalysts.

TABLE 2

Toluene Hydrogenation Test

| Catalyst | % Pt | % Pd | Catalyst Support | Treq 40% Conversion, deg C. |
|---|---|---|---|---|
| A | 0.3 | 0.5 | $SiO_2$—$Al_2O_3$ | 107 |
| B | 0.3 | 0.5 | $B_2O_3$—$SiO_2$—$Al_2O_3$ | 106 |
| C | 0.3 | 0.5 | $ZrO_2$—$SiO_2$—$Al_2O_3$ | 103 |
| D | 0.3 | 0.5 | $ZrO_2$—$SiO_2$ | 100 |

[Tol] = 1.8% in $H_2$; P = 1 atm; T = 140 C.; SV = 250 ml/g-min

Results from the toluene hydrogenation test (Table 1) show that catalysts prepared with the zirconia containing supports were more active hydrogenation catalysts than those made with the silica-alumina and boria-silica-alumina supports. The catalysts prepared with the zirconia containing supports were then tested in a diesel hydrogenation test with an actual commercial feedstock that had been spiked to 50 ppm sulfur with benzothiophene. The results are shown in Table 3.

TABLE 3

Diesel Hydrogenation Test

| Catalyst | % Pt | % Pd | Catalyst Support | Treq 80% Conversion, deg C. |
|---|---|---|---|---|
| B | 0.3 | 0.5 | $B_2O_3$—$SiO_2$—$Al_2O_3$ | 237 |
| C | 0.3 | 0.5 | $ZrO_2$—$SiO_2$—$Al_2O_3$ | 233 |
| D | 0.3 | 0.5 | $ZrO_2$—$SiO_2$ | 215 |

Note:
Temperature required for 80% conversion determined after 500 hrs on-stream
P = 600 psig ; H2/Oil = 2500 SCF/bbl; LHSV = 1.5; Feed sulfur = 50 ppm; SFC Aromatics = 47.6 wt %; D2887 distillation 95% pt = 265° C.

The results in Table 3 show that the zirconia containing catalysts show superior hydrogenation activity in the presence of sulfur, especially the catalyst prepared on the zirconia-silica support.

Reasonable variations and modifications, which will be apparent to those skilled in the art, can be made within the scope of the disclosure and appended claims without departing from the scope of this invention.

That which is claimed is:

1. A method of preparing a sulfur tolerant aromatics hydrogenation catalyst composition, wherein said method comprises:
co-mulling from 1 to 30 wt. % of a zirconium compound and from 60 to 99 wt % of an inorganic oxide selected from the group consisting of silica, alumina and silica-alumina to form a mixture;
forming an agglomerate particle comprising said mixture; and
calcining said agglomerate particle to thereby provide a calcined particle suitable for use as a catalyst support;
incorporating into said catalyst support from 0.01 to 5 wt % of a platinum component and from 0.01 to 5 wt % of a palladium component in a weight ratio of elemental palladium-to-platinum of 1:10 to 10:1, to provide an intermediate catalyst composition; and
calcining said intermediate catalyst composition to thereby provide a final sulfur tolerant aromatics hydrogenation catalyst composition.

2. A method as recited in claim 1, wherein said mixture contains an amount of said zirconium compound such that said calcined particle has a zirconium content in the range of from 0.5 to 20 wt. % zirconium based on the total weight of said calcined particle.

3. A method as recited in claim 2, wherein said zirconium compound is selected from the group consisting of oxides, nitrates, sulfates, silicates, carbonates, acetates, chlorides, hydroxides, and hydrates of zirconium.

4. A method as recited in claim 3, wherein said mixture contains an amount of said inorganic oxide material such that said calcined particle has an inorganic oxide content in the range of from 70 to 99 wt. % inorganic oxide.

5. A method as recited in claim 4, wherein said platinum component and said palladium component are present in a weight ratio of elemental palladium-to-platinum in the range of from 1:2 to 5:1.

6. A method as recited in claim 5,
wherein said intermediate catalyst composition is calcined at a temperature from 250° C. to 550° C. to thereby provide said final sulfur tolerant aromatics hydrogenation catalyst composition.

7. A sulfur tolerant aromatics hydrogenation catalyst, comprising:

from 0.01 to 5 wt % of a platinum component and from 0.01 to 5 wt % of a palladium component in a weight ratio of elemental palladium-to-platinum in the range of 1:10 to 10:1, and a calcined mixture as a catalyst support, wherein said mixture of said calcined mixture, before calcination, comprises a zirconium compound that has been co-mulled with an inorganic oxide selected from the group consisting of silica, alumina and silica-alumina, and wherein the zirconium content of said calcined mixture is in the range from 1 to 30 wt % and the inorganic oxide content of said calcined mixture is in the range from 70 to 90 wt %.

8. A sulfur tolerant aromatics hydrogenation catalyst as recited in claim 7, wherein said calcined mixture comprises silica and alumina in relative amounts such that the molar ratio of silica-to-alumina is in the range of from 1:10 to 10:1.

9. A sulfur tolerant aromatics hydrogenation catalyst as recited in claim 8, wherein said zirconium compound is present in said calcined mixture in an amount in the range of from 0.5 to 20 wt. % with the weight percent being based on the total weight of the aromatics hydrogenation catalyst and calculated as elemental metal.

10. A sulfur tolerant aromatics hydrogenation catalyst as recited in claim 9, wherein said platinum component and said palladium component are present in a weight ratio of elemental palladium-to-platinum in the range of 1:2 to 5:1.

11. A sulfur tolerant aromatics hydrogenation catalyst as recited in claim 10, wherein said platinum component and said palladium component are present in a weight ratio of elemental palladium-to-platinum in the range of 1:1 to 3:1.

12. A sulfur tolerant aromatics hydrogenation catalyst as recited in claim 11, wherein said aromatics hydrogenation catalyst has a surface area in the range of from 300 $m^2$/gm to 600 $m^2$/gm.

13. A sulfur tolerant aromatics hydrogenation catalyst as recited in claim 12, wherein said aromatics hydrogenation catalyst has a pore volume in the range of from 0.7 ml/gm to 1.3 ml/m and a median pore diameter in the range of from 50 angstroms to 250 angstroms.

14. A sulfur tolerant aromatics hydrogenation catalyst as recite in claim 7, wherein said calcined mixture has a silica-to-alumina molar ratio of greater than 10:1.

15. A sulfur tolerant aromatics hydrogenation catalyst as recited in claim 14, wherein said zirconium compound is present in said calcined mixture in an amount in the range of from 3 to 30 wt. % with the weight percent being based on the total weight of the aromatics hydrogenation catalyst and calculated as elemental metal.

16. A sulfur tolerant aromatics hydrogenation catalyst as recited in claim 15, wherein said platinum component and said palladium component are present in a weight ratio of elemental palladium-to-platinum in the range of 1:2 to 5:1.

17. A sulfur tolerant aromatics hydrogenation catalyst as recited in claim 16, wherein said platinum component and said palladium component are present in a weight ratio of elemental palladium-to-platinum in the range of 1:1 to 3:1.

18. A sulfur tolerant aromatics hydrogenation catalyst as recited in claim 17, wherein said aromatics hydrogenation catalyst has a surface area in the range of from 200 $m^2$/gm to 500 $m^2$/gm.

19. A sulfur tolerant aromatics hydrogenation catalyst as recited in claim 18, wherein said aromatics hydrogenation catalyst has a pore volume in the range of from 0.7 ml/gm to 1.3 ml/gm and a median pore diameter in the range of from 50 angstroms to 250 angstroms.

20. A sulfur tolerant aromatics hydrogenation catalyst, comprising: from 1 to 30 wt % zirconia, from 0.01 to 5 wt % of a platinum component and from 0.01 to 5 wt % of a palladium component in a weight ratio of elemental palladium-to-platinum in the range of 1:10 to 10:1, and from 60 to 99% inorganic oxide selected from the group consisting of silica, alumina and silica-alumina, wherein said amount of zirconia is incorporated into said sulfur tolerant hydrogenation catalyst by co-mulling with said inorganic oxide.

21. A sulfur tolerant aromatics hydrogenation catalyst composition made by any one of the methods of claims 1 through 6.

22. A sulfur tolerant aromatics hydrogenation catalyst composition suitable for treating hydrocarbon feedstocks having a sulfur concentration in the range from 10 to 1,000 ppm, comprising: from 1 to 30 wt % zirconia, from 0.01 to 5 wt % of a platinum component and from 0.01 to 5 wt % of a palladium component in a weight ratio of elemental palladium to platinum of 1:2 to 5:1, and from 70 to 99% inorganic oxide selected from the group consisting of silica, alumina and silica-alumina, wherein said amount of zirconia is incorporated into said sulfur tolerant hydrogenation catalyst by co-mulling with said inorganic oxide, and wherein the surface area of said sulfur tolerant aromatics hydrogenation catalyst is in the range of from 200 $m^2$/gm to 500 $m^2$/gm, the pore volume is in the range of from 0.7 ml/gm to 1.3 ml/gm and a median pore diameter is in the range of from 50 angstroms to 250 angstroms.

23. A sulfur tolerant aromatics hydrogenation catalyst composition as recited in claim 22, wherein the weight ratio of the elemental palladium to platinum is 1:1 to 3:1.

24. A sulfur tolerant aromatics hydrogenation catalyst composition as recited in claim 23, wherein said inorganic oxide is silica and the amount of co-mulled zirconia is from 5 to 25 wt %.

25. The method of claim 5, wherein said palladium and platinum are incorporated into said catalyst support in a weight ratio of elemental palladium to platinum of 1:1 to 3:1 using an impregnating solution containing tetraamine platinum (II) nitrate and tetraamine palladium (II) nitrate.

* * * * *